US006064361A

United States Patent [19]

Akiyama

[11] Patent Number: 6,064,361

[45] Date of Patent: May 16, 2000

[54] METHOD OF DRIVING LCD

[75] Inventor: Takashi Akiyama, Saitama, Japan

[73] Assignee: Citizen Watch Co., Ltd., Tokyo, Japan

[21] Appl. No.: 08/175,423

[22] PCT Filed: May 19, 1993

[86] PCT No.: PCT/JP93/00658

§ 371 Date: Jan. 12, 1994

§ 102(e) Date: Jan. 12, 1994

[87] PCT Pub. No.: WO93/27385

PCT Pub. Date: Nov. 25, 1993

[30] Foreign Application Priority Data

May 19, 1992 [JP] Japan .................................... 4-150076

[51] Int. Cl.[7] ...................................................... G09G 3/36

[52] U.S. Cl. ................................ 345/98; 345/95; 345/89; 345/211

[58] Field of Search ................................. 345/89, 94, 95, 345/96, 97, 98, 99, 100, 147, 148, 149, 211; 348/790, 791, 792, 793; 359/54, 55; 349/33, 34

[56] References Cited

U.S. PATENT DOCUMENTS

| | | | |
|---|---|---|---|
| 3,938,136 | 2/1976 | Kawakami | 345/95 |
| 4,921,334 | 5/1990 | Akodes | 345/89 |
| 5,196,738 | 3/1993 | Takahara et al. | 345/147 |
| 5,216,417 | 6/1993 | Honda | 345/89 |

FOREIGN PATENT DOCUMENTS

| | | |
|---|---|---|
| 63-6855 | 1/1988 | Japan . |
| 63-109497 | 5/1988 | Japan . |
| 63-201629 | 8/1988 | Japan . |
| 63-235995 | 9/1988 | Japan . |
| 2-79092 | 3/1990 | Japan . |

*Primary Examiner*—Xiao Wu
*Attorney, Agent, or Firm*—Armstrong, Westerman, Hattori, McLeland & Naughton

[57] ABSTRACT

In order to perform a multi-gradation display of high quality on a liquid crystal panel (6) by a small-scale A/D converter (1), a 4 - bit A/D converter (1) is equipped with four reference potential couples for performing the dither method using arbitrary two reference potential couples in each of two fields to display a signal at a first pixel. Likewise the remaining two reference potential couples are used for the dither method to display the signal at a second pixel adjacent thereto. In this way, the dither method is applied to adjacent pixels using different reference potential couples to generate an area gradation, so that it is possible to represent 64 gradations owing to the multiple effect of the dither method and the dot area modulation method. Moreover, it is possible to obtain a display of high quality which is free from flicker disturbance since the dither cycle is 1/30 second.

2 Claims, 8 Drawing Sheets

13a INPUT SWITCH
1 4-BIT A/D CONVERTER
7 DATA BUS
4-BIT DATA
21
2 SIGNAL ELECTRODE DRIVING CIRCUIT
TV SIGNAL
IN
Vt1
Vt2
Vt3
Vt4
Vrt
MEMORY
22 PULSE WIDTH MODULATION CIRCUIT
13 MULTIPLEXER
Vb1
Vb2
Vb3
Vb4
Vrb
SCANNING ELECTRODE DRIVING CIRCUIT
LIQUID CRYSTAL PANEL
6
13b INPUT SWITCH
ϕ1 ϕ2 ϕ3 ϕ4
CONTROLLER
5
14

F I G. 4
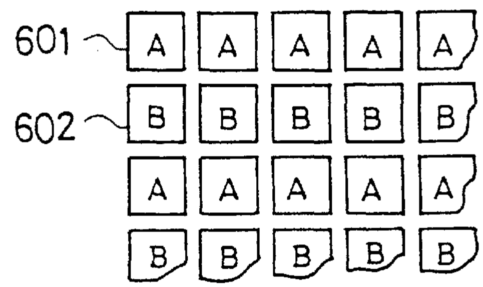
F I G. 5
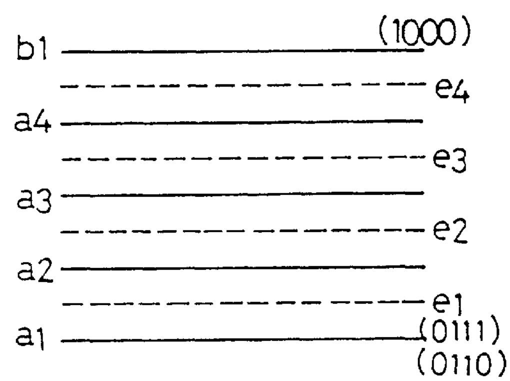
F I G. 6
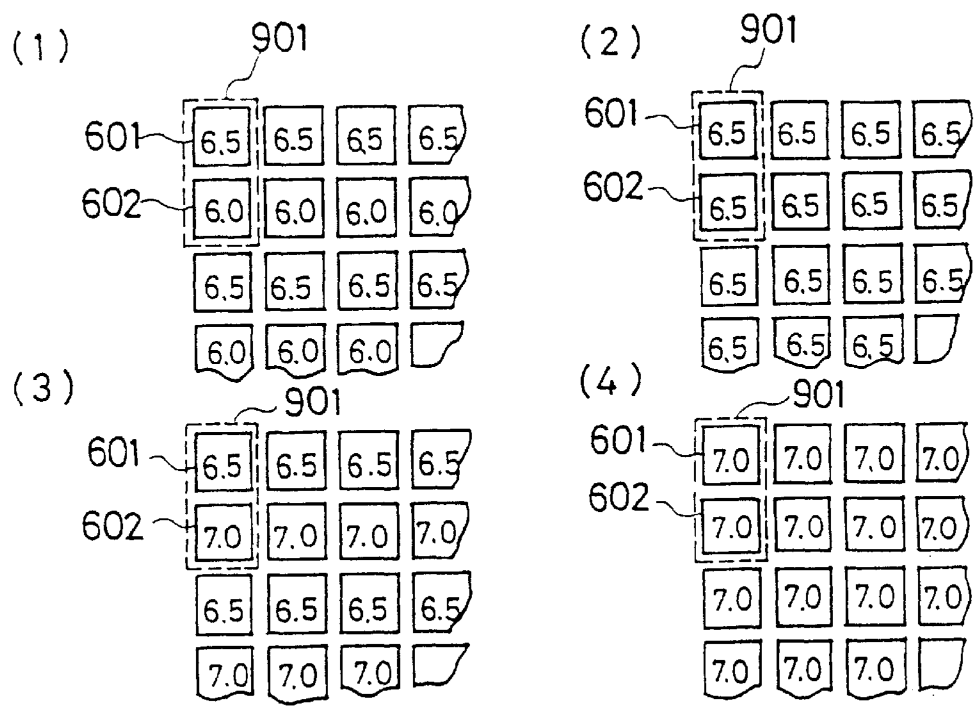

METHOD OF DRIVING LCD

TECHNICAL FIELD

The present invention relates to a method of driving an LCD (liquid crystal display) which performs multi-gradation display, more in detail, to a method of driving an LCD which performs multi-gradation display based on an image information quantized by an A/D converter (analog-digital converter).

BACKGROUND TECHNOLOGY

Recently a digital signal processing has been generally applied to an image display. For example, when the analog signal of TV, etc. is subjected to an A/D conversion, there appears a false outline of a displayed image since the continuity of gradation is lost (quantization noise). Many liquid crystal TVs which employ LCDs as display elements also use A/D converters. Passive matrix panels for displaying moving pictures generally employ a method of subjecting a luminance signal to A/D conversion and thereafter converting the resulting digital signal into a pulse width, and it is known that active matrix panels employing MIM elements can also use a similar method (e.g., refer to Japanese Patent Publication No. 63 - 6855).

Many liquid crystal TVs employ a 4 - bit A/D converter for the purpose of miniaturization or securing portability. The number of gradations which can be displayed by 4 - bit data, however, is as few as 16, so that quantization noise is conspicuous.

FIG. 16 is a block diagram exemplifying a system for improving image quality using a dither method. In the system, a TV signal is input to the input terminal IN of a 4 - bit A/D converter 1, which supplies an A/D converted 4 - bit data to a memory 21 in a signal electrode driving circuit 2.

A multiplexer 3 comprises an upper switch 31 for switching to the upper reference potentials Vt1 or Vt2 and a lower switch 32 for switching to the lower reference potentials Vb1 or Vb2 at the input sides thereof, the switches 31 and 32 being coupled to the upper reference potential input terminal Vrt and the lower reference potential input terminal Vrb of the 4 - bit A/D converter 1 respectively at the output sides thereof.

A clock $\phi 1$ produced by a controller 4 is supplied to the multiplexer 3 for controlling the switches 31 and 32 in liaison with each other.

The controller 4 also supplies a signal group $\phi 4$ including a start signal for timing the start of scanning, a clock for timing the successive shift of a selected pulse, etc. to a scanning electrode driving circuit 5.

Moreover, the A/D converter 1 and the signal electrode driving circuit 2 receive a signal group $\phi 3$ which is formed mainly on the basis of a horizontal synchronous signal, including a (data sampling clock, a shift clock which forms addresses in the memory 21, a latch clock which transfers data within the memory 21, a signal for timing a pulse width modulation, etc.

The signal electrode driving circuit 2 comprising the memory 21 and a pulse width modulation circuit 22 is coupled to each signal electrode of a liquid crystal panel 6 at each output terminal thereof and a scanning electrode driving circuit 5 is coupled to each scanning electrode of the liquid crystal panel 6 at each out put terminal thereof.

In FIG. 16, the memory 21 transfers all the data to the pulse width modulation circuit 22 after completion of successively reading the 4 - bit data in a cycle of horizontal scanning.

In a display method employing a common line sequential scanning, the A/D converter 1 quantizes a TV signal into 4 - bit data during a first horizontal scanning period and successively stores the same in memory 21. During a second horizontal scanning period, at first the data read by the latch clock of the clock group $\phi 3$ of the controller 4 is transferred to the pulse width modulation circuit 22.

The pulse width modulation circuit 22 subjects the transferred data to pulse width modulation and supplies the same to the signal electrodes of the liquid crystal panel 6. At that time, the scanning electrode driving circuit 5 supplies selective potentials to corresponding electrodes so as to apply a gradation driving signal to desired pixels together with the waveform produced by the signal electrode driving circuit 2.

Keeping pace therewith, the TV signal during a second horizontal scanning period is quantized into 4 - bit date, which is successively stored in the memory 21. Similarly, the application and sampling of the gradation driving signal are performed at desired pixels during a third horizontal scanning period. A picture is displayed by repeating this process over the entire frame.

A display of 32 gradations according to the dither method in such a system will be described hereinafter. It is supposed that the TV signal inputted to the A/D converter 1 is a raster signal having a uniform luminance and the liquid crystal panel 6 has 240 scanning electrodes for NTSC color system TV display.

Furthermore, the potentials Vt1, Vt2, Vb1 and Vb2 are supposed to have the following relations therebetween: $Vt1<Vt2$, $Vb1<Vb2$ The dither method is a method for displaying gradation by way of a plurality of fields, but the vertical resolution of an image is reduced to a half therein.

In the dither method employing two fields, at first in the first field the raster signal is converted to nth gradation using the reference potential couple Vt1 and Vb1 for an A/D conversion, and the resulting potential is applied to pixels.

Next in the second field, the reference potential couple is changed to Vt2 and Vb2 and the A/D converter 1 converts the raster signal to the nth or (n−1)th gradation based on the pulse-height difference. When they are converted to the nth gradation in both of the first and second fields, they are recognized as the nth gradation by sight.

On the other hand, when it is converted into the nth gradation in the first field while the (n−1)th gradation in the second field, they are leveled to be recognized as (n−0.5)th gradation by sight. In this way it is possible to display brightness by 0.5 gradation so as to enable a 32 gradation display using the 4 - bit A/D converter 1.

Supposing that the scanning period of a field is $1/60$ second, the scanning period of the dither method comprising the two fields becomes $1/30$ second so that there occurs no flicker. The dither method can be also explained on the basis of the responsibility of liquid crystal.

Other methods for gradation display using the binary display liquid crystal panel include a time sharing method and a dot area modulation method. The time sharing method adjusts the average amount of transmitting light by making the time ratio of the transparent state (hereinafter referred to as ON) and the opaque state (hereinafter referred to as OFF) of a pixel correspond to the display gradation. The dot area modulation method divides the pixel into sub-pixels in such a way as to make the area ratio of the ON-state sub-pixels and the OFF-state sub-pixels correspond to the gradation for making use of the spacial leveling effect of sight.

However, various problems are present in the prior art set forth above. The LCD of active matrix driving method employing MIM elements etc. has high contrast which is almost equal to that of CRT. Since in case of CRT the image quality of 64 gradation display is defined as a level wherein the obstruction is recognizable but ignorable, the lowest standard of image quality should be set at the 64 gradation display also in case of the LCD.

In order to realize the 64 gradation display by the pulse width modulation alone, it is enough to subject the signal to a 6 - bit data processing using a 6 - bit A/D converter. However, when the number of bits of the A/D converter is increased by 1, the number of comparators is doubled and the size of the memory used in the driver portion is also doubled, which causes a problem of an enlarged circuit and high cost.

In order to display brightness at 64 gradations according to the dither method using the 4 - bit A/D converter, it is sufficient to display four pictures (four fields in case of TV) in a frame. Four sets of upper and lower reference potentials which are shifted from one another by ¼ LSB are switched to one another in each picture.

Human eyes recognize brightness in time average when it varies with a frequency more than about 30 Hz, but they recognize the variation of brightness as a flicker when it varies with a frequency less than 30 Hz.

The inventor's experiment proved that when the four upper and lower reference potential couples were switched to each field in displaying TV image, a flicker of about 15 Hz appeared to obstruct the view remarkably. When the multi-gradation display is performed by multiplying the dither method using the small-scale A/D converter in this way, there occurs a problem of generating the flicker difficulty.

Each pixel is divided into sub-pixels in order to perform the multi-gradation display according to the dot area modulation method. As a least dividing method, for example, in case of a 16 gradation display, each pixel is divided into four sub-pixels, the dot area ratio of which is 1:2:4:8, wherein transparent pixels and opaque pixels are selected according to gradation data.

In order to display up to 64 gradations according to this method, each pixel needs to be divided into 6 sub-pixels each of which is driven under independent control. Accordingly, the dot area modulation method has a problem in that the number of pixels has to be increased for multi-gradation display and consequently the number of control lines is also increased.

It is the object of the present invention to solve the problems set forth above and to provide a method of driving an LCD for performing multi-gradation display of high quality using a small-scale A/D converter.

SUMMARY OF THE INVENTION

In order to attain the above object according to an aspect of the present invention, a method of driving an LCD which is equipped with an A/D converter and a liquid crystal panel and which converts an image display signal into a quantized display data by the A/D converter set forth above according to reference potentials, applies signal electrode driving signals to the signal electrodes of the liquid crystal panel based on the display data and successively selects the scanning electrodes of the liquid crystal panel so as to display the display data on the liquid crystal panel comprises the steps of generating more than two reference potential groups which output a plurality of reference potentials set forth above, wherein the reference potentials of each reference potential group are set to be different from those of other reference potential groups, selecting the reference potential groups in each field at a given cycle, selecting the potential of the above selected reference potential group in each field at a given cycle at each scanning electrode of the liquid crystal panel or at each sampling cycle of the A/D converter and subjecting the selected potential to an A/D conversion so as to display the display data on the liquid crystal panel.

According to another aspect of the invention, the method may comprise the steps of selecting the reference potential groups in each field at a given cycle, selecting the potential of the selected reference potential group at a given cycle at each sampling cycle of the A/D converter within the field, selecting the reference potential by shifting the sampling cycle from the corresponding reference potential by a cycle with regard to each scanning electrode of the liquid crystal panel and subjecting the selected reference potential to an A/D conversion so as to display the display data on the liquid crystal panel.

This method of driving LCD can display brightness at gradations the number of which is a product of that obtained by the resolution of the A/D converter and the number of reference potential groups by using the dither method. Moreover, supposing that A/D conversions are performed in two pixels which are adjacent to each other based on different reference potentials therein, it is possible to further double the number of gradations by employing the dot area modulation method since the adjacent two pixels can be perceived in brightness by human eyes in an average.

That is, all in all, it is possible to display brightness at gradations the number of which is a product of that obtained by the resolution of the A/D converter, that effected by the dither method and that effected by the dot area modulation method.

BRIEF DESCRIPTION OF THE DRAWINGS

FIG. 4 is an enlarged view of the left upper corner of a liquid crystal panel according to a first embodiment of the invention, FIG. 5 is a view for explaining the relationship between reference potentials and an input voltage according to the first embodiment, FIG. 6 is enlarged views of pixels at the gradation display of the first embodiment wherein (1), (2), (3) and (4) are enlarged views of pixels in case of pulse heights e1, e2, e3 and e4 respectively.

DETAILED DESCRIPTION OF THE PREFERRED EMBODIMENTS

The preferred embodiments of the invention will be described with reference to attached drawings in order to explain the invention more in detail.

First Embodiment: FIGS. 1 to 6

Figure 1:
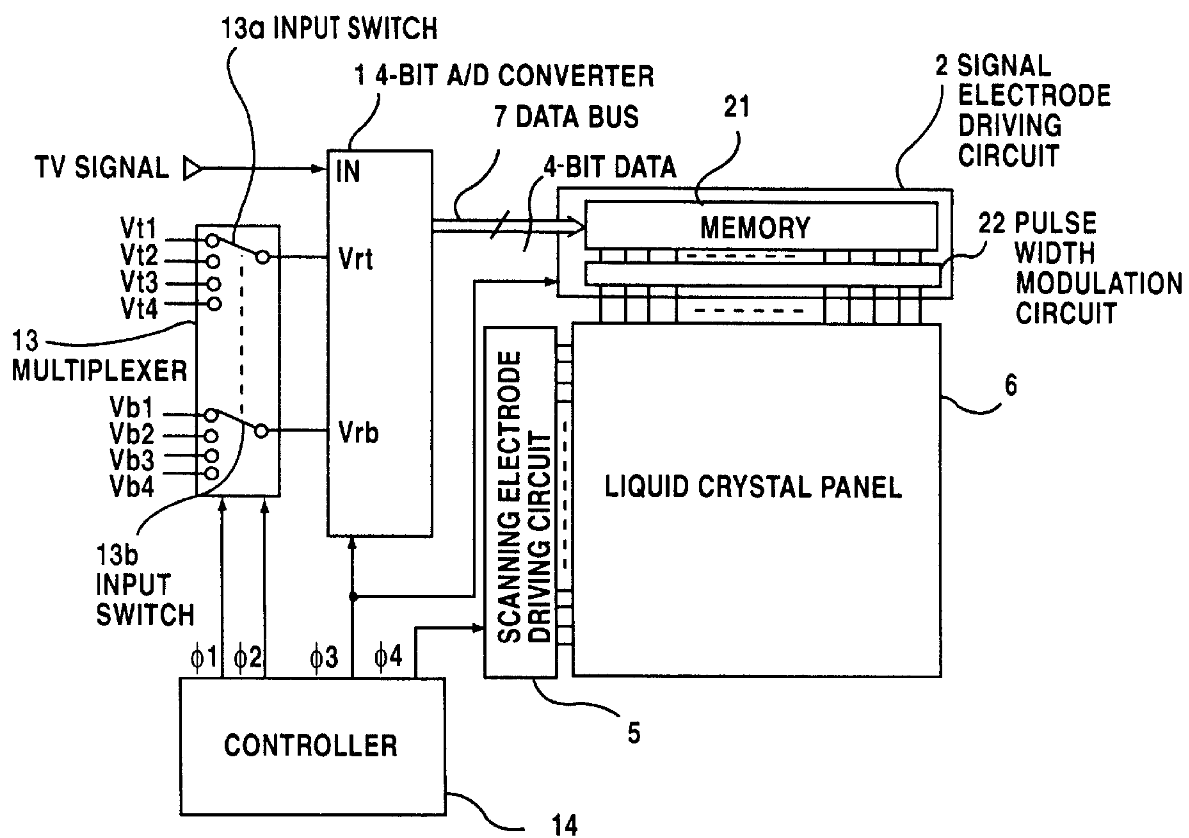
FIG. 1 is a block diagram of the invention.
Figure 16:
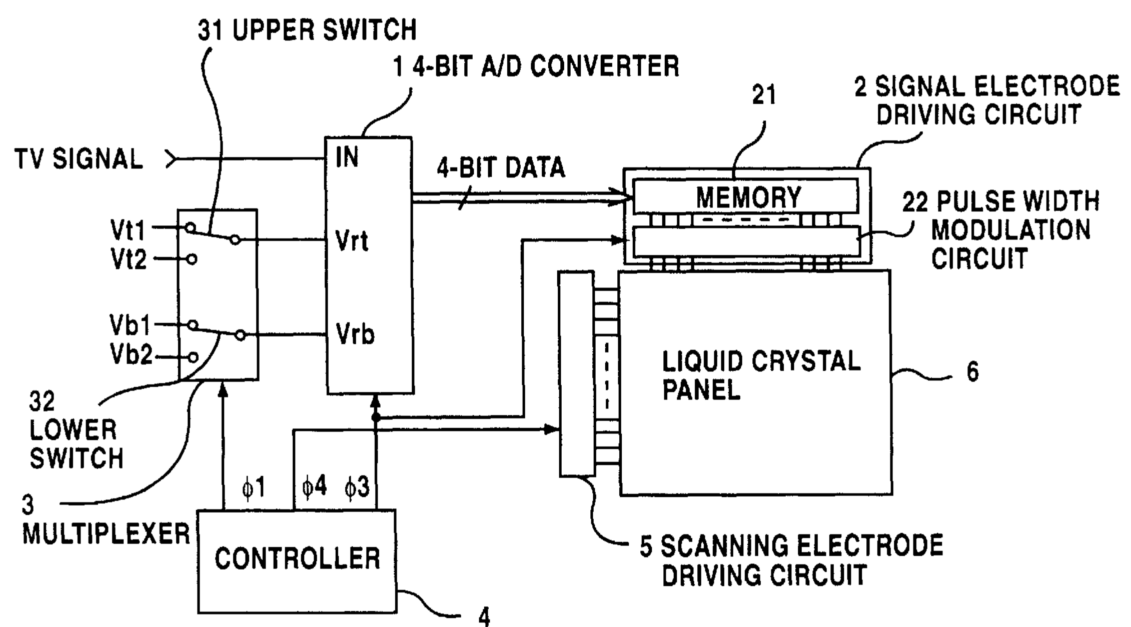
FIG. 16 is a block diagram exemplifying a system for improving the quality of picture according to the conventional dither method.

FIG. 1 is a block diagram of an LCD according to a first exemplary embodiment of the invention wherein the same parts as illustrated in FIG. 16 are denoted at same numerals and the number of reference potential couples of an A/D converter is supposed to be "2".

In FIG. 1, one (Vt1 in the figure) of the four upper reference potentials Vt1 to Vt4 is inputted to the upper reference potential input terminal Vrt of a 4 - bit A/D converter 1 by way of an input switch 13*a* in a multiplexer 13, while one (Vb1 in the figure) of the lower reference potentials Vb1 to Vb4 is inputted to the lower reference potential input terminal Vrb of the 4 - bit A/D converter 1 by way of an input switch 13*b* in the multiplexer 13.

A TV signal is inputted in the input terminal IN of the A/D converter 1, the output data of which is supplied to a memory 21 in a signal electrode driving circuit 2 by way of a data bus 7. The signal electrode driving circuit 2 composed of the memory 21 and a pulse width modulator 22 is coupled to each signal electrode of a crystal display panel 6 at each output terminal thereof.

A controller 14 supplies clocks φ1 and φ2 to the multiplexer 13, a signal group φ3 to the A/D converter and the signal electrode driving circuit 2 and a signal group φ4 to a scanning electrode driving circuit 5.

The upper and lower reference potentials Vt2 to Vt4 and Vb2 to Vb4 are set to be shifted from the preceding voltage in ascending order thereof starting at the upper and lower reference potentials Vt1 and Vb1 respectively by a fourth of the voltage resolution determined by the least significant bit (referred to as "LSB" hereinafter) of the output of the 4 - bit A/D converter. That is, the following equations are established.

$$Vb2=Vb1+\tfrac{1}{4}LSB$$

$$Vb3=Vb1+\tfrac{2}{4}LSB$$

$$Vb4=Vb1+\tfrac{3}{4}LSB$$

$$Vt2=Vt1+\tfrac{1}{4}LSB$$

$$Vt3=Vt1+\tfrac{2}{4}LSB$$

$$Vt4=Vt1+\tfrac{3}{4}LSB$$

At that time, the lower reference potential Vb1 is set to be the black level of the TV signal, while the upper reference potential Vt4 is set to be the white level thereof. Each reference potential may be shifted from the preceding voltage in descending order starting it Vt1 and Vb1. At that time the lower reference potential Vb1 is set to be the black level while the upper reference potential Vt1 to the white level Hereupon, the upper and lower reference potentials Vt1 and Vb1, Vt2 and Vb2, Vt3 and Vb3 and Vt4 and Vb4, respectively, form reference potential couples, so that they will be denoted at reference potential couples Vt1–Vb1, Vt2–Vb2, Vt3–Vb3 and Vt4–Vb4 for the convenience of explanation hereinafter.

In the first field, 2 couples in the above reference potential couple group Vt1–Vb1, Vt2–Vb2, Vt3–Vb3 and Vt4–Vb4 are selected by the multiplexer 13 to be applied to the upper and looser reference potential input terminals Vrt and Vrb of the A/D converter 1. Likewise in the second field, the remaining two reference potential couples are selected by the multiplexer 13 to be applied to the upper and lower reference potential input terminals Vrt and Vrb of the A/D converter 1.

The TV signal of NTSC color system constitutes a frame by two fields and has a frame cycle of 1/30 second. The reference potential couples for performing the dither method are switched from one group to the other every 1/30 second if the dither method is performed in every field, which is not recognized as a flicker by human eyes.

Table 1 is a table for setting relations among the clocks φ1 and φ2, the upper and lower reference potentials Vt1, Vt2, Vt3, Vt4, Vb1, Vb2, Vb3 and Vb4 and the upper and lower reference potential input terminals Vrt and Vrb which are supplied to the multiplexer 13 according to the first embodiment.

When the clock φ1 is HIGH (denoted at "1" in the table 1) and the clock φ2 is LOW (denoted at "0" in the table 1), the upper and lower reference potential input terminals Vrt and Vrb receive the upper and lower reference potentials Vt1 and Vb1 respectively.

Likewise, the Vrt and Vrb receive the Vt3 and Vb3 respectively When both of the clocks φ1 and φ2 are HIGH, receive the Vt4 and Vb4 respectively when both of the clocks φ1 and φ2 are LOW "0" and receive the Vt2 and Vb2 respectively when the clock φ1 is LOW "0" and the clock φ2 is HIGH "1".

Table 2 shows reference potential couples corresponding to pixels A and B when the embodiment employs the dither method. The pixels A and B are pixels which are adjacent to each other and different from each other in the scanning electrode thereof. A signal to be displayed at the pixel A is subjected to an A/D conversion by the reference potential couples Vt1–Vt1 and Vt4–Vt4 in the first and second field respectively. Likewise, A signal to be displayed at the pixel B which is the second pixel is subjected to an A/D conversion by the reference potential couples Vt3–Vb3 and Vt2–Vb2 in the first and second field respectively.

Figure 2:
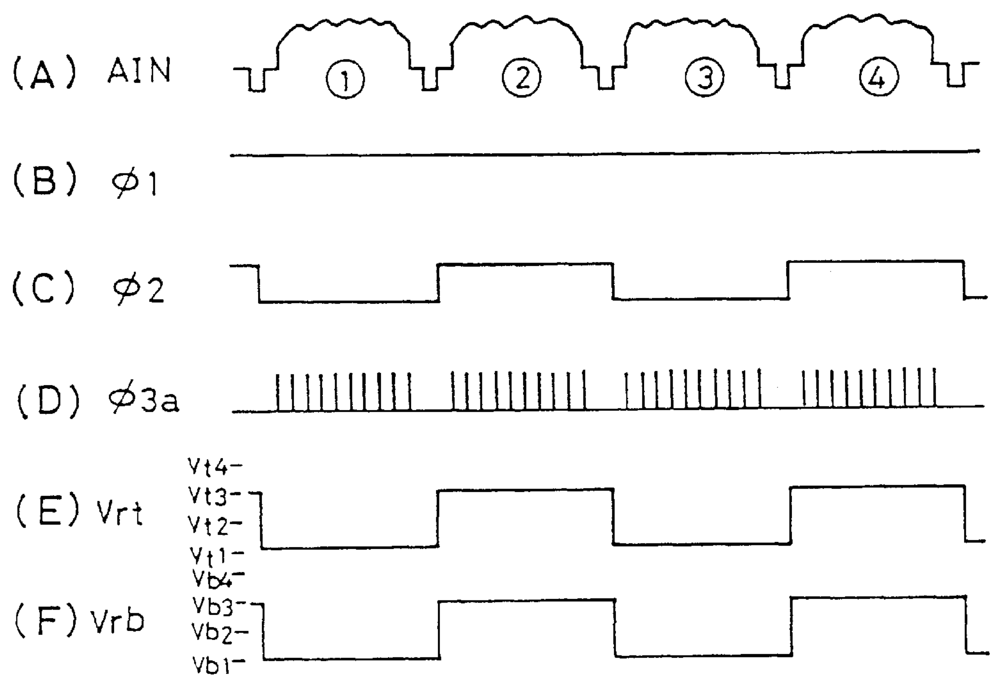
FIG. 2 is the timing chart of a first field in FIG. 1.
Figure 3:
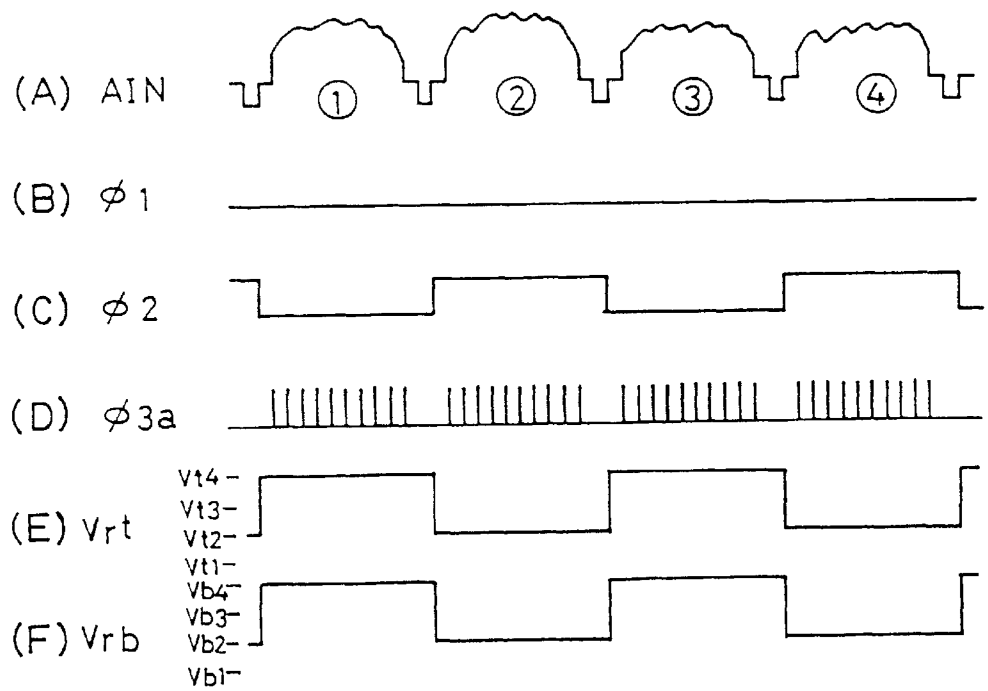
FIG. 3 is the timing chart of a second field.

The timing charts of the LCD driving method according to the first embodiment are shown in FIGS. 2 and 3, wherein FIG. 2 is the timing chart of a TV signal in the first field.

In FIG. 2, denoted at AIN in (A) is a TV signal supplied to the A/D converter 1, wherein the components of signal displayed by the pixels on the first, second, third and fourth scanning electrodes which are counted from top to down of the liquid crystal panel 6 are denoted at encircled numerals ①, ②, ③ and ④.

(B) shows the clock φ1 which goes HIGH in the first field, (C) shows the clock φ2 which switches to LOW or HIGH in case of the odd-numbered or even-numbered scanning signals respectively and (D) shows a sampling clock φ3a of the A/D converter 1 exemplified in the signal group φ3.

(E) shows the potential of the upper reference potential input terminal Vrt of the A/D converter 1 which is one of the upper reference potentials Vt1 to Vt4 inputted by way of the multiplexer 13.

(F) shows the potential of the lower reference potential input terminal Vrb of the A/D converter 1 which is one of the lower reference potentials Vb1 to Vb4 inputted by way of the multiplexer 13.

The sampling clock φ3a shown in (D) has nothing with the actual timing of the embodiment but simply represents the mutual relations among signals. It represents a simplified model of 10 time sampling in a horizontal scanning period instead of a several hundred time practical sampling therein.

In FIG. 2, the clock φ1 in the first field is HIGH "1" while the clock φ2 is LOW "0" during the odd-numbered scanning periods 1 and 3. According to table 2, the upper and lower reference potentials Vt1 and Vb1 are supplied to the upper and lower reference potential input terminals Vrt and Vrb by way of the switches 13*a* and 13*b* in the multiplexer 13 respectively.

Accordingly, the TV signal is subjected to an A/D conversion by way of a reference potential couple of the upper and lower reference potentials Vt1 and Vb1 during the odd-numbered scanning periods ① and ③ of the first field.

Next, the clock φ2 is switched from LOW to HIGH in logical value during the even-numbered scanning periods ② and ④ of the first field, so that the switches 13*a* and 13*b* are operated according to table 2 so as to apply the upper and lower reference potentials Vt3 and Vb3 to the upper and lower reference potential input terminals Vrt and Vrb respectively.

In this way, the data which have teen subjected to an A/D conversion by the reference potential couples Vt1–Vb1 and Vt3–Vb3 are displayed by the pixel groups on the odd-numbered and even-numbered scanning electrodes respectively in the first field.

FIG. 3 is a timing chart of the TV signal in the second field, wherein the numerals are the same as those in FIG. 2.

In FIG. 3, (A) shows the TV signal AIN, wherein the components of signal displayed by the pixels on the first, second, third and fourth scanning electrodes which are counted from top to down of the liquid crystal panel 6 are denoted at encircled numerals ①, ②, ③ and ④.

(B) shows a clock φ1 which goes HIGH in logical value in the second field, (C) shows a clock φ2, (D) shows a sampling clock φ3a, (E) shows the potential of the upper reference potential input terminal Vrt and (F) shows the potential of the lower reference potential input terminal Vrb.

Although (C) and (D) are the same as in FIG. 2, (E) and (F) are different from those in FIG. 2 not only in phase bit also in potential, i.e., the potentials in (E) and (F) are Vt4 and Vb4 at HIGH level and Vt2 and Vb2 at LOW level respectively.

In FIG. 3, the clock φ1 in the second field is LOW "0" and the clock φ2 is LOW "0" during the odd-numbered scanning periods ① and ③, so that the upper and lower reference potentials Vt4 and Vb4 are applied to the upper and lower reference potential input terminals Vrt and Vrb of the A/D converter 1 respectively according to table 2 by way of the switches 13*a* and 13*b* in the multiplexer 13.

Accordingly, the TV signal is subjected to an A/D conversion using the reference potential couple of the upper and lower reference potentials Vt4 and Vb4 during the odd-numbered scanning periods ① and ③ of the second field.

Next, the clock φ2 is switched from LOW to HIGH in logical value during the even-numbered scanning periods ② and ④ of the second field, so that the switches 13*a* and 13*b* in the multiplexer 13 are switched according to table 2 in such a way as to apply the upper and lower reference potentials Vt2 and Vb2 to the upper and lower reference potential input terminals Vrt and Vrb of the A/D converter 1 respectively. In this way, the data which have teen subjected to an A/D conversion by the reference potential couples Vt4–Vb4 and Vt2–Vb2 are displayed by the pixel groups on the odd-numbered and even-numbered scanning electrodes respectively in the second field.

FIG. 4 is an enlarged view of the upper left corner of the liquid crystal panel 6 according to the first embodiment. Since pixel 601 which is selected as a first pixel on an odd-numbered scanning electrode is displayed using the reference potential couples Vt1–Vb1 and Vt4–Vb4 in the first and second fields and the dither method of two-field cycle, it corresponds to pixel A in table 2.

On the other hand, since pixel 602 which is selected as a second pixel on an even-numbered scanning electrode is displayed using the reference potential couples Vt3–Vb3 and Vt2–Vb2 and the dither method of two-field cycle, it corresponds to pixel B in table 2. These are denoted at A and B in each pixel.

Since different reference potential couples perform an A/D conversion with regard to each horizontal scanning period in this embodiment, pixels A and B each of which is respectively aligned horizontally and which are adjacent to each other generate a dot area modulation display effect vertically. This effect will be described hereinafter more in detail with reference to FIGS. 5 to 8.

FIG. 5 is a view for explaining the relationship between comparison potentials determined by the upper and lower reference potentials Vt1–Vt4 and Vb1–Vb4 and the inputted TV signal voltage. The A/D converter 1 of this embodiment determines the comparison potentials by dividing the voltage between the upper and lower reference potentials into 14 equal parts to quantize the TV signal thereby.

In FIG. 5, when the TV signal is quantized by the reference potential couple of the upper and lower reference potentials Vt1 and Vb1, the potential level (comparison potential) corresponding to the border between the sixth gradation (0110) and the seventh gradation (0111) is denoted at a1 and likewise that corresponding to the border between the seventh and eighth gradations is denoted at b1.

The comparison potential a1 for the sixth gradation is the sixth potential of the potentials determined by dividing the voltage between the potentials of the reference potential couple into 14 equal parts as they are counted from bottom to top. Likewise, the comparison potentials at the borders between the sixth and seventh gradations when the TV signal is quantized by the upper and lower reference potentials Vt2 and Vb2, Vt3 and Vb3 and Vt4 and Vb4 are denoted at a2, a3 and a4 respectively.

Since $Vt1<Vt2<Vt3<Vt4$ and $Vb1<Vb2<Vb3<Vb4$ are established with regard to the upper and lower reference potentials respectively, $a1<a2<a3<a4<b1$ is established. It is supposed that $a1<e1<a2<e2<a3<e3<a4<e4<b1$ is established among the a1, a2, a3 and a4 and the pulse heights e1, e2, e3 and e4 of the inputted TV signal.

The gradations in case a raster signal having a given luminance e1 is inputted under such a condition will be described with reference to FIG. 5.

A signal displayed at pixel A on an odd-numbered scanning electrode in the first field is represented at 7th gradation (0111) since the signal is quantized using the adjacent comparison potential a1 and the pulse height e1 is higher than the comparison potential a1.

A signal which is displayed on an odd-numbered scanning electrode in the second field is represented at 6th gradation (0110) since it is quantized using the comparison potential a4 therein and the pulse height e1 thereof is lower than the a4.

Next, a signal which is displayed at pixel B on an even-numbered scanning electrode in the first field is represented at 6th gradation since it is quantized by the comparison potential a3 and the pulse height e1 thereof is lower than the a3. Likewise, since a signal having the pulse height e1 is quantized by the comparison potential a2 in the second field and the pulse height e1 is lower than the a2, it is represented at 6th gradation.

This result and the results of similar consideration with regard to pulse heights e2, e3 and e4 are shown together in table 3. In the table, "e" is the pulse height of a raster signal, "1F" is the gradation of the first field, "2F" is the gradation of the second field, "dither" is a gradation as a result of the dither method alone and "area gradation" is a gradation summing up those effected by the dot area modulation method according to the invention.

In case of the pulse height e1, a pixel (denoted at A) on an odd-numbered scanning line represents it at 7th gradation (7 in table 3) in the first field, while at 6th gradation (6 in table 3) in the second field.

A signal at A is recognized to be displayed at brightness corresponding to 6.5th gradation by human eyes owing to the characteristics thereof that the brightness of a pixel is recognized by human eyes in a time average (It is written in the column of dither in table 3).

On the other hand, a signal that is displayed at a pixel on an even-numbered scanning line is of 6th gradation in both of the first and second fields, so that the time average of the gradation thereof is also the 6th gradation (It is written in the column of dither in table 3).

Likewise, in case of the pulse height of e1, the TV signal has a two-field cycle (1 frame cycle) of 1/30 second at odd-numbered scanning electrodes, so that the variation of brightness is not recognized as a flicker by human eyes. Adjacent pixels A and B represent the pulse height at 6.5th and 6th gradations respectively, which are averaged to be 6.25th gradation by human eyes in a small area (It is written in the column of "area gradation" in table 3).

Likewise, in case of the pulse height of e2, pixel A represents it at 7th and 7th gradations in the first and second fields respectively. Pixel B represents it at 6th and 7th gradations in the first and second fields respectively. When the pulse height is subjected to the dither method, both of the pixels A and B represent it at 6.5th gradation so that the area gradations thereof become also the 6.5th gradation.

In case of the pulse height of e3, pixel A represents it at 7th and 6th gradations in the first and second fields respectively while pixel B represents it at 7th and 7th gradations in the first and second fields respectively. When the pulse height is subjected to the dither method, the pixel A and pixel B represent it at 6.5th and 7th gradations respectively, so that the area gradation thereof becomes 6.75th gradation.

In case of the pulse height of e4, pixels A and B represent it at 7th and 7th gradations in the first and second fields respectively. When the pulse height is subjected to the dither method, the pixels A and B represent it at 7th gradation, so that the area gradation thereof becomes the 7th gradation.

FIG. 6 is an enlarged view of pixels which displays the content of table 3. In FIG. 6, (1), (2), (3) and (4) show the state of display in case of the pulse heights of e1, e2, e3 and e4, corresponding to the e1, e2, e3 and e4 in table 3 respectively.

In FIG. 6 (1), the pixel 601 on an odd-numbered scanning line represents the pulse height at 6.5th gradation corresponding to the e1 in table 3 while the pixel 602 on an even-numbered scanning line represents it at 6.0th gradation, these gradations being written in the pixels 601 and 602. The pixel couple 901 that is surrounded by a dot line in the figure is composed of the pixel 601 on the odd-numbered scanning line and pixel 602 on the even-numbered scanning line, the pixels being adjacent to each other.

As described above, human eyes have a characteristic that they spacially average adjacent pixels in brightness in sight so long as the difference therebetween is ignorable relative to the resolution of sight.

The pixels 601 and 602 of the pixel couple 901 are also averaged in brightness in sight owing to a gradation display method (the dot area modulation method) that takes advantage of this characteristic, so that the pixel couple is spacially averaged in brightness to be of 6.25th gradation since the pixel 601 is of 6.5th gradation and pixel 602 is of 6.0th gradation.

Likewise in FIG. 6 (2), all pixels represent the pulse height at 6.5th gradation so that the area gradation thereof is also the 6.5th gradation and in FIG. 6 (3), pixels 601 on the odd-numbered scanning electrodes represent it at 6.5th gradation while pixels 602 on the even-numbered scanning electrodes represent it at 7.0th gradation so that the area gradation of the pixel couples 901 is 6.75th graduation. In FIG. 6 (4), all pixels represent it at 7.0th gradation so that the area gradation thereof is 7.0th gradation.

As described above, according to the invention which combines the dither method and the dot area modulation method, it is possible to identify pulse heights e1, e2, e3 and e4 from one another by sight, all of which were represented at 7th gradation and therefore could not be identified from one another according to conventional methods of display.

Moreover, it is free from flicker disturbance owing to the dither method of 30 Hz and can obtain a spacially smooth picture since it employs the dot area modulation method wherein adjacent pixels can be identified from each other in brightness by 0.5 gradation.

In other words, three new gradation levels 6.25, 6.5 and 6.75 are generated between the 6th gradation (0110) and the 7th gradation (0111), realizing 64 gradations in all, i.e., four times as many as 16 gradations that can be realized by the 4 - bit A/D converter.

Different from such a raster signal, actual TV signals vary in time as well as in space, but this method generates little display errors since there is little difference in luminance between points which are close to each other in time and space.

Even if the difference is large, the order of display error generated by this method is small within a gradation and therefore is not so conspicuous.

This first embodiment employs a reference potential couple Vt1–Vb1 and Vt4–Vb4 for pixel A and a reference potential couple Vt3–Vb3 and Vt2–Vb2 for pixel B for use in the dither method.

However, a similar effect can be also obtained by repeating the above consideration with reference to FIGS. 5 and 6 employing a reference potential couple Vt1–Vb1 and Vt2–Vb2 for pixel A and a reference potential couple Vt3–Vb3 and Vt4–Vb4 for pixel B. Likewise a similar effect can be also obtained by employing a reference potential couple Vt1–Vb1 and Vt3–Vb3 for pixel A and a reference potential couple Vt2–Vb2 and Vt4–Vb4 for pixel B.

Second Embodiment: FIGS. 7 to 13

The first embodiment selects adjacent pixels vertically (in the direction of adjacent scanning electrodes) for the dot area modulation method. A second embodiment which selects adjacent pixels horizontally (in the direction of adjacent signal electrodes) will be described with reference to FIGS. 7 to 13 hereinafter.

Figure 7:
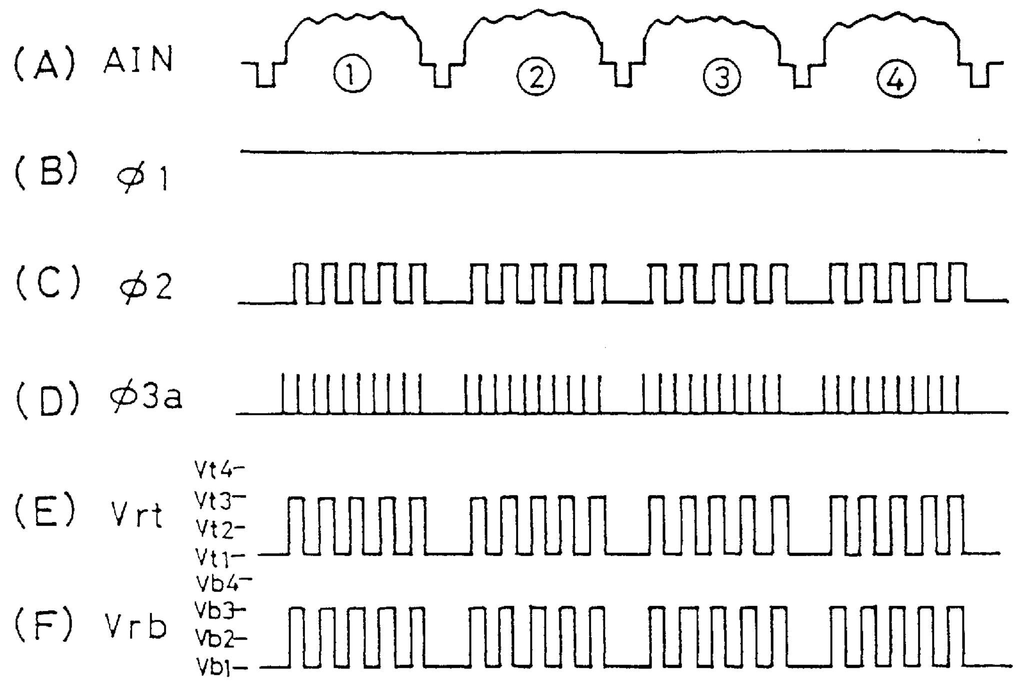
FIG. 7 is the timing chart of the first field according to a second embodiment of the invention.
Figure 8:
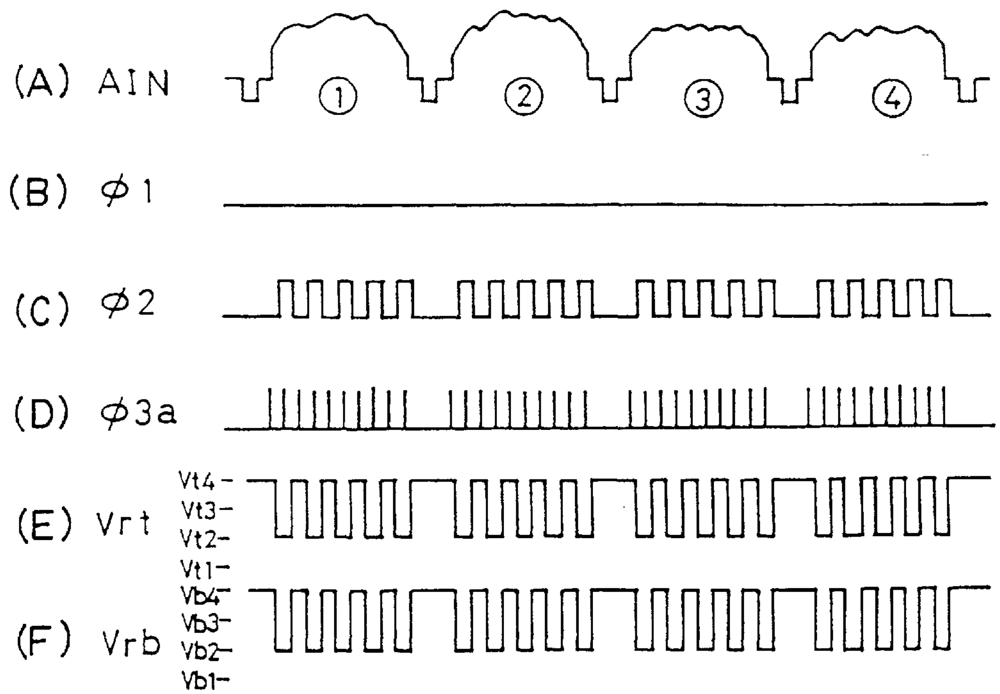
FIG. 8 is the timing chart of the second field according to the second embodiment.

FIGS. 7 and 8 are timing charts for explaining the operation of the second embodiment, wherein (A) to (F) respectively correspond to (A) to (F) in FIGS. 2 and 3. The system employed in this embodiment is common to that of the first embodiment illustrated in FIG. 1.

In FIG. 7 (C), the clock $\phi 2$ for switching multiplexer 13 goes LOW and HIGH in accordance with the sampling clock of the A/D converter 1 illustrated in (D).

Likewise in FIG. 8 (C), the clock $\phi 2$ in the second field also goes LOW and HIGH in accordance with the sampling clock $\phi 3a$ illustrated in (D).

In the first field, the clock $\phi 1$ is HIGH, so that the upper reference potentials Vt1 and Vt3 are alternately inputted in the upper reference potential input terminal Vrt at each data sampling of the A/D converter 1 as illustrated in (E) according to table 2 and the lower reference potentials Vb1 and Vb3 are alternately inputted in the lower reference potential input terminal Vrb as illustrated in (F) at each data sampling.

In the second field, the clock $\phi 1$ inputted in the multiplexer 104 is LOW, so that the upper reference potentials Vt2 and Vt4 and the lower reference potentials Vb2 and Vb4 are alternately inputted in the upper and lower reference potential input terminals Vrt and Vrb as illustrated in (E) and (F) respectively.

According to this embodiment, the data displayed at a pixel on an odd-numbered signal electrode is subjected to an A/D conversion by way of a reference potential couple of the upper reference potential Vt1 and the lower reference potential Vb2 in the first field while by way of a reference potential couple of the upper reference potential Vt4 and the lower reference potential Vb4 in the second field, so that the pixel becomes the pixel A in table 3.

Likewise, the data displayed at a pixel on an even-numbered signal electrode is subjected to an A/D conversion by way of a reference potential couple of the upper reference potential Vt3 and the lower reference potential Vb3 in the first field while by way of a reference potential couple of the upper reference potential Vt2 and the lower reference potential Vb2 in the second field, so that the pixel becomes the pixel B in table 3.

Figure 9:
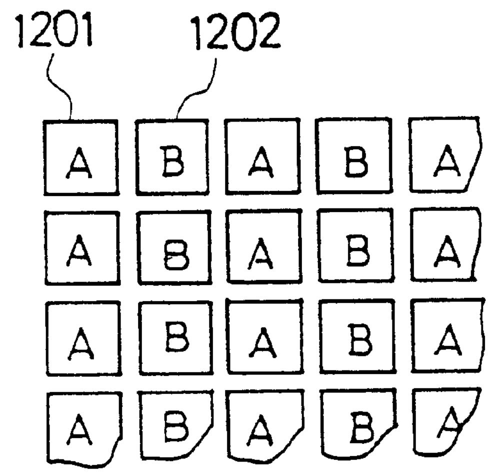
FIG. 9 is an enlarged view of the upper left corner of the liquid crystal panel according to the second embodiment.

FIG. 9 shows an array of the pixels A and B set forth above. FIG. 9 is an enlarged view of the upper left corner of the liquid crystal panel 6 which performs display according to the dither method of the second embodiment, wherein pixel 1201 on an odd-numbered signal electrode is pixel A and pixel 1202 on an even-numbered signal electrode is pixel B. The types of pixels A and B are written in each pixel.

As illustrated in FIG. 9, pixels A and B are aligned in column respectively and are adjacent to each other in row.

Figure 10:
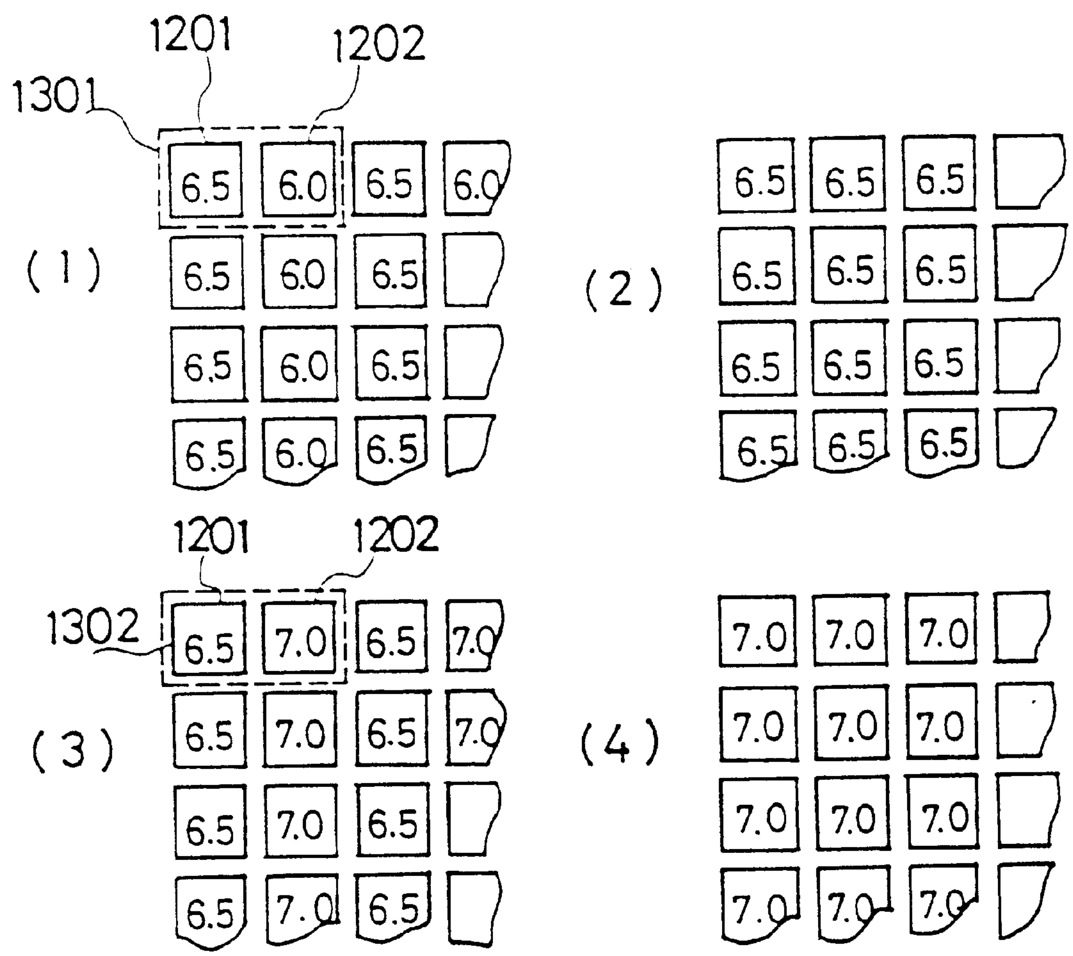
FIG. 10 is an enlarged view of pixels in case of a raster display of uniform luminance according to the second embodiment, wherein (1), (2), (3) and (4) are enlarged views of pixels at pulse heights e1, e2, e3 and e4 respectively.

A display obtained by the second embodiment is shown in FIG. 10. FIG. 10 is an enlarged view of pixels which represent the pulse heights e1 to e4 in FIG. 5, wherein (1), (2), (3) and (4) display the states of pixels in case of the pulse heights e1, e2, e3 and e4 respectively.

The display state of pixels A and B is common to that of the first embodiment in case of the e1, e2, e3 and e4 in table 3.

In FIG. 10 (1), the pixel 1201 on an odd-numbered signal electrode represents 6.5th gradation since it is pixel A, while the pixel 1202 represents 6.0th gradation since it is pixel B these A and B being written in the pixels. In the figure, the pixel couple 1301 which is surrounded by a dot line is composed of the pixel 1201 on the odd-numbered signal electrode and the pixel 1202 on the even-numbered signal electrode, these pixels being adjacent to each other.

Similarly to the first embodiment, the gradation of the pixel couple 1301 becomes the average of those of the pixels 1201 and 1202, i.e., 6.25th gradation according to the dot area modulation method. In case of (2), all pixels are of 6.5th gradation, so that the area gradation thereof is the 6.5th gradation. In case of (3), the pixel 1201 on an odd-numbered signal electrode represents 6.5th gradation and the pixel 1202 on an even-numbered signal electrode represents 7.0th gradation, so that the area gradation thereof is 6.75th gradation. In case of (4), all pixels represent 7.0th gradation, so that the area gradation thereof is also 7.0th gradation.

Third Embodiment: FIGS. 11 to 14

In the first and second embodiments set forth above, adjacent pixels which are different from one another in gradation are aligned vertically and horizontally respectively. When a liquid crystal projector etc. performs an enlarged display, sometimes vertical or horizontal stripes of bright and dark having the difference of 0.5 gradation in brightness are observed.

Figure 11:
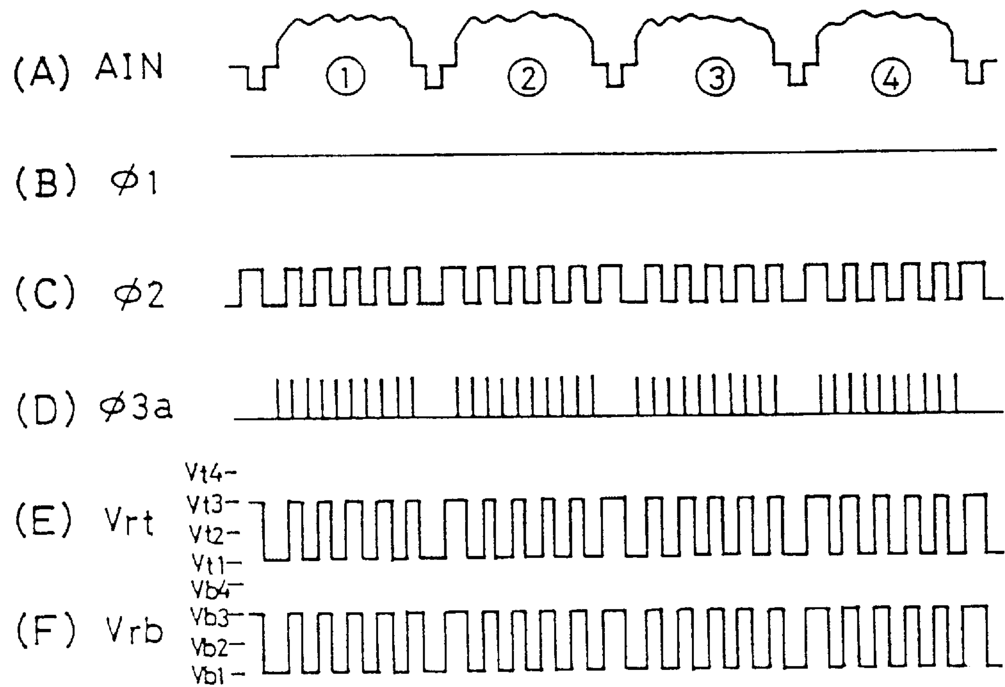
FIG. 11 is the timing chart of the first field according to a third embodiment of the invention.
Figure 12:
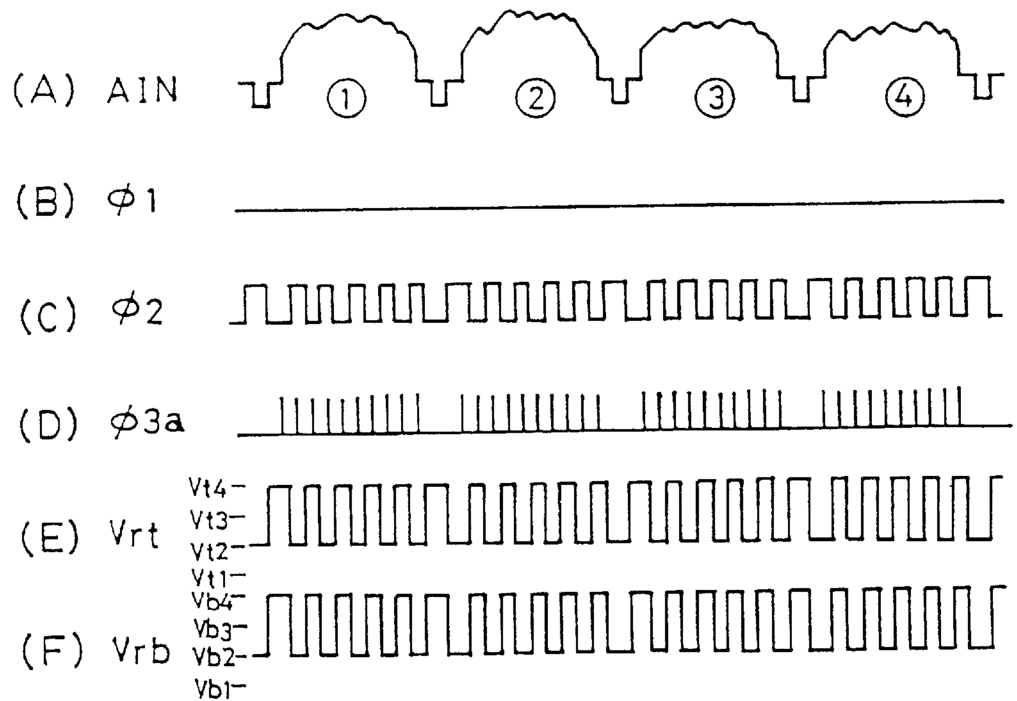
FIG. 12 is the timing chart of a second field according to the third embodiment.

As a countermeasure, a third embodiment which takes advantage of the characteristic of eyesight that it is less sensitive to a skew pattern will be described with reference to FIGS. 11 to 14. In FIGS. 11 and 12, (A) to (F) respectively correspond to (A) to (F) in FIGS. 2 and 3, which show the timing charts according to the first and second embodiments respectively, FIG. 7 and FIG. 8.

In FIGS. 11 and 12, the clock $\phi 2$ of the multiplexer 13 and the waveforms of the upper and lower reference potential input terminals Vrt and Vrb are different from those of the first and second embodiments, but the controlling relation between the clocks $\phi 1$ and $\phi 2$ and the upper and lower reference potential input terminals Vrt and Vrb is supposed to be the same as in the first and second embodiments as shown in table 1.

The clock $\phi 2$ shown in FIG. 11 (C) is reversed in logic value at each sampling clock $\phi 3a$ of the A/D converter 1 and moreover at each horizontal synchronous signal of the inputted TV signal too.

Figure 13:
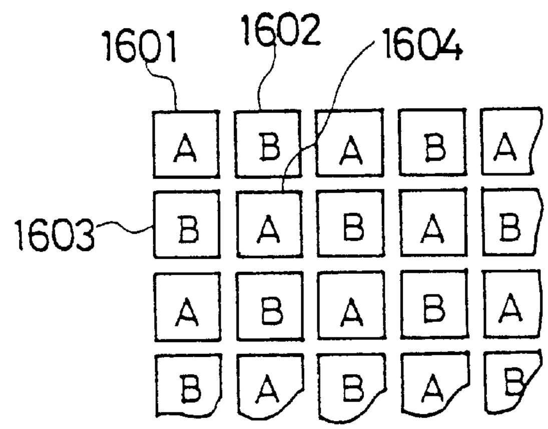
FIG. 13 is an enlarged view of the upper left corner of the liquid crystal panel according to the third embodiment.

As a result, the clock $\phi 2$ goes LOW when a signal displayed by a pixel located at the intersection of an odd-numbered scanning electrode and an odd-numbered signal electrode is subjected to an A/D conversion, so that the upper and lower reference potentials Vt1 and Vb1 are inputted in the upper and lower reference potential input terminals Vrt and Vrb in the first field (FIG. 11 (E) and FIG. 11 (F)), while the upper and lower reference potentials Vt4 and Vb4 are inputted in the upper and lower reference potential input terminals Vrt and Vrb (FIG. 11 (E) and FIG. 11 (F)), which results in the pixel A in FIG. 13.

Likewise, the clock $\phi 2$ also goes LOW when a signal displayed by a pixel located at the intersection of an even-numbered scanning electrode and an even-numbered signal electrode is subjected to an A/D conversion, which result in pixel A.

On the contrary, when a signal displayed by a pixel located at the intersection of an odd-numbered scanning electrode and an even-numbered signal electrode is subjected to an A/D conversion, the clock $\phi 2$ is HIGH, which results in pixel B. Likewise a pixel at the intersection of an even-numbered scanning electrode and an odd-numbered signal electrode is pixel B.

FIG. 13 shows an array of the pixels A and B set forth above. FIG. 13 is an enlarged view of a liquid crystal panel for display according to the dither method of the third embodiment, wherein pixel 1601 at the intersection of an odd-numbered scanning electrode and an odd-numbered signal electrode is pixel A;

pixel 1602 at the intersection of an odd-numbered scanning electrode and an even-numbered signal electrode is pixel B;

pixel 1603 at the intersection of an even-numbered scanning electrode and an odd-numbered signal electrode is pixel B; and pixel 1604 at the intersection of an even-numbered scanning electrode and an even-numbered signal electrode is pixel A. The pixel types A and B are written in the pixels. Accordingly, the pixels A and B are arranged askew.

Figure 14:
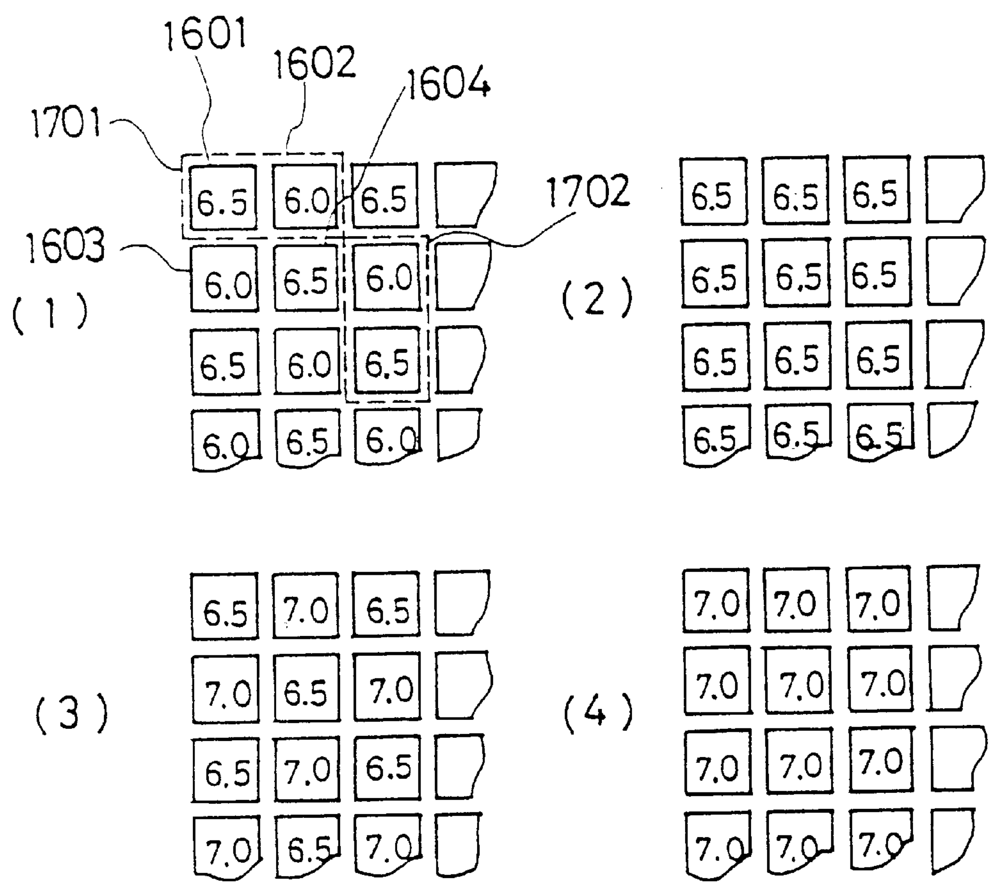
FIG. 14 is an enlarged view of pixels in case of a raster display of uniform luminance according to the third embodiment, wherein (1), (2), (3) and (4) are enlarged views of pixels at pulse heights e1, e2, e3 and e4 respectively.

FIG. 14 is an enlarged view of pixels which display an example of TV signal having the pulse heights e1, e2, e3 and e4 illustrated in FIG. 5 according to the method of the third embodiment. In the figure, the same numerals as those in FIG. 13 denote the same pixels. (1) to (4) in FIG. 14 represent gradations in pixels in case of the pulse heights e1, e2, e3 and e4 respectively.

For example, in (1) wherein the pulse heights is e1, pixel A represents 6.5th gradation while pixel B represents 6.0th gradation. The area gradation of the area 1701 which contains horizontally adjacent pixels 1601 and 1602 and which is surrounded by a dot line is 6.25th gradation.

The area gradation of the area 1702 which contains vertically adjacent pixels and which is surrounded by a dot line is also 6.25th gradation. As a result, the stripes of bright and dark, i.e., 6.5th and 6.0th gradations, become less conspicuous. In (2) wherein the pulse height is e2, all pixels represent 6.5th gradation. In (3) wherein the pulse height is e3, pixel A represents 6.5th gradation while pixel B represents 7.0th gradation, so that the area gradation thereof is 6.75th gradation. In (4) all pixels represent 7.0th gradation.

Figure 15:
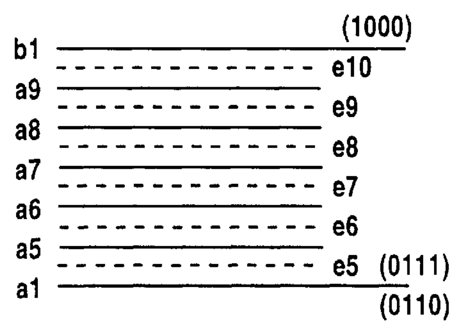
FIG. 15 is a view for explaining the relationship between the switching potentials and the pulse heights according to a fourth embodiment.

Fourth Embodiment: FIG. 15 and tables 4 and 5

A fourth embodiment of the invention wherein reference potential groups are composed of 6 reference potential couples (n=3) will be described with reference to tables 4 and 5 and FIG. 15.

Table 4 is a table for explaining pixels to which two dither methods are applied. In table 4, the upper and lower reference potentials Vt1 and Vt1 are common to the first, second and third embodiments, and the upper reference potentials Vt1, Vt5, Vt6, Vt7, Vt8 and Vt9 and the lower reference potentials Vb1, Vb5, Vb6, Vb7, Vb8 and Vb9 are set to be shifted from the preceding one by ⅙ LSB in this order.

The upper and lower reference potentials Vt1 and Vb1, Vt5 and Vb5, Vt6 and Vb6, Vt7 and Vb7, Vt8 and Vb8 and Vt9 and Vb9 make reference potential couples, each couple being combined by way of "–" in table 4 (e.g., Vt1–Vb1).

A signal to be displayed at pixel C is subjected to an A/D conversion by the reference potential couples Vt1–Vb1, Vt6–Vb6 and Vt8–Vb8 in the first, second and third fields respectively and thereafter is subjected to the dither method. Likewise, a signal to be displayed at pixel D is subjected to an A/D conversion by the reference potential couples Vt5–Vb5, Vt7–Vb7 and Vt9–Vb9 in the first, second and third fields respectively and thereafter is subjected to the dither method.

FIG. 15 is a view for explaining the relation between the switching potentials and the pulse heights according to the fourth embodiment, wherein the switching potentials a1 and b1 are the same as those in FIG. 5.

In FIG. 15, the switching potentials a5, a6, a7, a8 and a9 correspond to the switching potentials between the 6th and 7th gradations when the signal is subjected to an A/D conversion by the reference potential couples Vt5–Vb5, Vt6–Vb6, Vt7–Vb7, Vt8–Vb8 and Vt9–Vb9.

a1<e5<a5<e6<a6<e7<a7<e8<a8<e9<a9<e10<b1 is established among the pulse heights e5~e10.

Table 5 is a table which shows the display states of the pulse heights e5~e10. Pixel C represents 7th gradation at the pulse height of e5 in the first field since the pulse height of e5 is higher than the comparison potential a1 therein and represents 6th gradation in the second and third fields since the pulse height of e5 is lower than the comparison potentials a6 and a8 therein. When the pulse height is subjected to the dither method, the pixel C represents it at 6.33th gradation.

Pixel D represents 6th gradation in the first, second and third fields since the pulse height e5 is lower than the comparison potentials a5, a7 and a9 therein and represents the 6.00th gradation even if the pulse height is subjected to the dither method. The area where the pixels C and D are arranged adjacent to each other is recognized by human eyes at 6.17th gradation owing to the effect of the dot area modulation method.

Likewise when the pulse height is e6, the pixels C and D represent the pulse height e6 at the 7th, 6th and 6th gradations in the first, second and third fields respectively. When pulse height is subjected to the dither method, the pixels C and D represent it at 6.33th gradation and the area gradation thereof becomes also the 6.33th gradation.

When the pulse height is e7, the pixel C represents it at the 7th, 7th and 6th gradations in the first, second and third fields respectively, while the pixel D represents it at the 7th, 6th and 6th gradations in the first, second and third fields respectively. When the pulse height is subjected to the dither method, the pixels C and D represent it at 6.67th and 6.33th gradations respectively and the area gradation thereof becomes 6.50th gradation.

When the pulse height is e8, the pixels C and D represent it at the 7th, 7th and 6th gradations in the first, second and third fields respectively. When the pulse height is subjected to the dither method, the pixels represent it at 6.67th gradation and the area gradation thereof becomes 6.67th gradation.

When the pulse height is e9, the pixel C represents it at the 7th, 7th and 7th gradations in the first, second and third fields respectively, while the pixel D represents it at the 7th, 7th and 6th gradations in the first, second and third fields respectively. When the pulse height is subjected the dither method, the pixels C and D represent it at 7.00th and 6.67th gradations respectively, and the area gradation thereof becomes 6.84th gradation.

When the pulse height is e10, the pixels C and D represent it at the 7th, 7th and 7th gradations in the first, second and third fields respectively. When the pulse height is subjected to the dither method, the pixels C and D represent it at 7.00 gradation and the area gradation thereof becomes also 7.00th gradation.

In this way according to the fourth embodiment, 6 reference potential couples are divided into two sets, i.e., Vt1–Vb1, Vt6–Vb6 and Vt8–Vb8 and Vt5–Vb5, Vt7–Vb7 and Vt9–Vb9 for performing the dither method, so as to triple the number of display gradations.

Moreover, the number of display gradations becomes 6 times as many as that of original display gradations in total owing to the effect of the dot area modulation method. It is possible to represent 96 gradations since the 4 - bit A/D converter having the resolution of 16 gradations is employed. In case of the TV signal of NTSC color system having the field cycle of 1/60 second, the flicker cycle becomes 1/20 second, which is the visibility limit, according to this embodiment which requires three fields for the dither method.

TABLE 1

| φ1 | φ2 | Vrt | Vrb |
|---|---|---|---|
| 1 | 0 | Vt1 | Vb1 |
| 1 | 0 | Vt3 | Vb3 |
| 0 | 0 | Vt4 | Vb4 |
| 0 | 1 | Vt2 | Vb2 |

TABLE 2

| PIXEL | FIRST FIELD | SECOND FIELD |
|---|---|---|
| PIXEL A | Vt1–Vb1 | Vt4–Vb4 |
| PIXEL B | Vt3–Vb3 | Vt2–Vb2 |

TABLE 3

| e | PIXEL | 1F | 2F | DITHER | AREA GRADATION |
|---|---|---|---|---|---|
| e1 | A | 7 | 6 | 6.5 | 6.25 |
| | B | 6 | 6 | 6.0 | |
| e2 | A | 7 | 6 | 6.5 | 6.5 |
| | B | 6 | 7 | 6.5 | |
| e3 | A | 7 | 6 | 6.5 | 6.75 |
| | B | 7 | 7 | 7.0 | |
| e4 | A | 7 | 7 | 7.0 | 7.0 |
| | B | 7 | 7 | 7.0 | |

TABLE 4

| PIXEL | FIRST FIELD | SECOND FIELD | THIRD FIELD |
|---|---|---|---|
| PIXEL C | Vt1-Vb1 | Vt6-Vb6 | Vt8-Vb8 |
| PIXEL D | Vt5-Vb5 | Vt7-Vb7 | Vt9-Vb9 |

TABLE 5

| e | PIXEL | 1F | 2F | 3F | DITHER | AREA GRADATION |
|---|---|---|---|---|---|---|
| e5 | C | 7 | 6 | 6 | 6.33 | 6.17 |
| | D | 6 | 6 | 6 | 6.00 | |
| e6 | C | 7 | 6 | 6 | 6.33 | 6.33 |
| | D | 7 | 6 | 6 | 6.33 | |
| e7 | C | 7 | 7 | 6 | 6.67 | 6.50 |
| | D | 7 | 6 | 6 | 6.33 | |
| e8 | C | 7 | 7 | 6 | 6.67 | 6.67 |
| | D | 7 | 7 | 6 | 6.67 | |
| e9 | C | 7 | 7 | 7 | 7.00 | 6.84 |
| | D | 7 | 7 | 6 | 6.67 | |
| e10 | C | 7 | 7 | 7 | 7.00 | 7.00 |
| | D | 7 | 7 | 7 | 7.00 | |

According to the LCD driving method of the invention, a small-scale A/D converter subjects a pixel to the dither method using a half of a plurality of reference potential couples and a pixel adjacent thereto to the dither method using the remaining half of the reference potential couples. As a result, the dither cycle can be shortened so that the flicker disturbance is prevented and the dot area modulation method takes effect, and consequently it is possible to realize a multi-gradation display owing to the multiple effect of the dither method and dot area modulation method to increase the number of gradations so as to enable a display of high quality in which the quantization noise is ignorable.

It is useful as a driving method of various liquid crystal displays used in a liquid crystal TV, office automation instruments, etc.

What is claimed is:

1. A method of driving an LCD which is equipped with an A/D converter and a liquid crystal panel and which converts an image display signal into a quantized display data by said A/D converter according to reference potentials, applies signal electrode driving signals to said signal electrodes of said liquid crystal panel based on said display data and successively selects the scanning electrodes of said liquid crystal panel so as to display said display data on said liquid crystal panel comprises the steps of:

generating a plurality of reference potential groups which each output a plurality of reference potential couples wherein the reference potentials of each reference potential group are set to be different from those of other reference potential groups;

selecting said reference potential groups in each field at a given cycle;

selecting the reference potential couple of said selected reference potential group in each field at a given cycle at each scanning electrode of said liquid crystal panel or at each sampling cycle of said A/D converter; and subjecting said selected reference potential couple to an A/D conversion so as to display said display data on said liquid crystal panel.

2. A method of driving an LCD which is equipped with an A/D converter and a liquid crystal panel and which converts an image display signal into a quantized display data by said A/D converter according to reference potentials, applies signal electrode driving signals to said signal electrodes of said liquid crystal panel based on said display data and successively selects the scanning electrodes of said liquid crystal panel so as to display said display data on said liquid crystal panel comprises the steps of:

generating a plurality of reference potential groups which each output a plurality of reference potential couples wherein the reference potentials of each reference potential group are set to be different from those of other reference potential groups, selecting said reference potential groups in each field at a given cycle, selecting the reference potential couple of said selected reference potential group in each field at each sampling cycle of said A/D converter, selecting said reference potentials by shifting said sampling cycle from corresponding reference potentials by a cycle with regard to each scanning electrode of said liquid crystal panel and subjecting the voltage of said selected reference potential couple to an A/D conversion so as to display said display data on a liquid crystal panel.

* * * * *